United States Patent
Friedl-Goeppentin et al.

(10) Patent No.: US 10,164,261 B2
(45) Date of Patent: Dec. 25, 2018

(54) MULTIFUNCTIONAL WEB FOR USE IN A LEAD-ACID BATTERY

(75) Inventors: Lutz Friedl-Goeppentin, Rastatt (DE); Régis Dumont-Roty, Pont-Audemer (FR)

(73) Assignee: GLATFELTER GERNSBACH GMBH & CO. KG, Gernsbach (DE)

( * ) Notice: Subject to any disclaimer, the term of this patent is extended or adjusted under 35 U.S.C. 154(b) by 0 days.

(21) Appl. No.: 14/127,411

(22) PCT Filed: May 23, 2012

(86) PCT No.: PCT/EP2012/059554
§ 371 (c)(1),
(2), (4) Date: Mar. 11, 2014

(87) PCT Pub. No.: WO2012/175269
PCT Pub. Date: Dec. 27, 2012

(65) Prior Publication Data
US 2014/0186660 A1    Jul. 3, 2014

(30) Foreign Application Priority Data
Jun. 20, 2011    (EP) .................................. 11170605

(51) Int. Cl.
*H01M 10/12*    (2006.01)
*H01M 4/68*    (2006.01)
*H01M 2/16*    (2006.01)
*H01M 4/20*    (2006.01)
*H01M 10/06*    (2006.01)

(52) U.S. Cl.
CPC ........... *H01M 4/68* (2013.01); *H01M 2/1626* (2013.01); *H01M 2/1673* (2013.01); *H01M 2/1686* (2013.01); *H01M 4/20* (2013.01); *H01M 10/06* (2013.01); *H01M 10/12* (2013.01); *Y10T 29/10* (2015.01)

(58) Field of Classification Search
None
See application file for complete search history.

(56) References Cited

U.S. PATENT DOCUMENTS 4,245,013 A * 1/1981 Clegg .................... H01M 2/14
429/144
4,363,856 A  12/1982 Waterhouse
(Continued)

FOREIGN PATENT DOCUMENTS

CN    1790776 A  *  6/2006
EP    0 228 603 A1     7/1987
(Continued)

OTHER PUBLICATIONS

He. CN 1790776 A machine translation.*
(Continued)

*Primary Examiner* — Wojciech Haske
(74) *Attorney, Agent, or Firm* — Blank Rome LLP (57) ABSTRACT

The present invention relates to a multifunctional web for use in a lead-acid battery comprising natural fibers and heat-sealable fibers, the use of the multifunctional web in a lead-acid battery, a lead plate comprising a metal grid coated with a lead paste contacting the multifunctional web, a method of preparing the lead plate and a lead-acid battery assembly comprising the lead plate.

15 Claims, 3 Drawing Sheets

(56) References Cited

U.S. PATENT DOCUMENTS

| | | | |
|---|---|---|---|
| 4,746,586 A * | 5/1988 | Mizutani | H01M 2/162 428/311.71 |
| 6,478,829 B1 * | 11/2002 | Zguris | H01M 2/1606 28/104 |
| 2004/0129632 A1 | 7/2004 | Le Brech et al. | |
| 2008/0014506 A1 * | 1/2008 | Sugiyama | H01M 2/1613 429/246 |
| 2009/0148760 A1 | 6/2009 | Justice | |

FOREIGN PATENT DOCUMENTS

| | | | |
|---|---|---|---|
| GB | 1395685 | | 5/1975 |
| JP | S5861559 A | | 4/1983 |
| JP | H0878014 | * | 3/1996 |
| JP | 3287127 | | 3/2002 |
| JP | 2002-313331 A | | 10/2002 |
| JP | 2004-127578 | | 4/2004 |
| RU | 2 084 049 C1 | | 7/1997 |
| WO | WO 2010/044264 A1 | | 4/2010 |
| WO | WO-2010/098796 | | 9/2010 |

OTHER PUBLICATIONS

Horie et al. JP H0878014 machine translation.*
International Search Report and Written Opinion dated Nov. 6, 2013 for corresponding international patent application No. PCT/EP2012/059554.
Extended European Search Report dated Dec. 2, 2011 for priority European patent application No. 11170605.7.
Chinese Decision on Rejection dated Dec. 5, 2017, issued in connection with Chinese Application No. 201280024326.7.

* cited by examiner

Before treatment with sulphuric acid:

After treatment with sulphuric acid:

MULTIFUNCTIONAL WEB FOR USE IN A LEAD-ACID BATTERY

CROSS REFERENCE TO RELATED APPLICATIONS

This application is the U.S. national phase of International Patent Application Number PCT/EP2012/059554 filed on May 23, 2012 which claims priority to European Patent Application Number 11170605.7 filed Jun. 20, 2011, the contents of each of which are incorporated by reference herein in their entireties for all purposes.

FIELD OF THE INVENTION

The present invention relates to a multifunctional web for use in a lead-acid battery, the use of the multifunctional web in a lead-acid battery, a lead plate comprising the multifunctional web, a method of preparing the lead plate and a lead-acid battery assembly comprising the lead plate.

BACKGROUND OF THE INVENTION

Lead-acid batteries typically contain lead plates that are prepared by applying a lead paste to a metal grid and then drying the thus obtained plates. In order to absorb humidity from the lead paste and in order to ensure that the paste remains on the grid during the production process, a pasting paper is typically used as a support material. This paper is put under the grid and above the lead paste when the lead paste is laid down on the grid. The thereby finished lead plate is cut into appropriate sizes and dried and cured in ovens. Typically, a separator is inserted between two lead plates, thereby separating the plates in order to prevent a short-circuit between the plates during use in a lead-acid battery. This assembly can be placed into a cell of a battery thermoplastic container. The thermoplastic container is filled with sulphuric acid serving as an electrolyte and the battery thermoplastic container is closed with a cover.

Conventional pasting paper is made of natural fibres that will be disintegrated over time by the sulphuric acid. This leads to the formation of a gap between the lead plates or the lead plate and the separator (if present) that might cause erosion of the lead plate, in particular due to friction, thereby gradually deteriorating the performance of the battery.

Lead-acid batteries are typically used in vehicles as starter batteries. The automotive industry needs batteries with high life cycles due to the increased production of cars with environmental-friendly technology. Accordingly, there is a strong demand for higher life-cycle batteries. In particular, new technologies such as the "start and stop" technology, developed in order to save energy and to reduce the carbon dioxide emission, leads to an increased load for the lead-acid batteries because of the higher number of cycles of charge and discharge. Some of the cars having this new technology are still using conventional lead-acid batteries. Besides the conventional lead-acid batteries, absorptive glass mat (AGM) type batteries are known wherein the sulphuric acid electrolyte is immobilized between the lead plates. These AGM batteries have a better life cycle due to the pressure between separator and plate.

The life-cycle performances of floated lead-acid batteries are reduced because of the erosion of lead during the use. The erosion is in particular caused by friction and chemical reactions between the lead plates and the high temperature reached in the environment of the engine. Bad road conditions further decrease the life cycle of floated lead-acid batteries.

Conventional pasting paper used for lead-acid batteries are made of natural fibres that are dissolved in the sulphuric acid electrolyte. Because of this dissolution, conventional pasting paper has got no function in the battery itself.

OBJECT OF THE INVENTION

The object of the present invention is to provide a multifunctional web by use of which the erosion of the lead plate in a lead-acid battery can be reduced, thereby improving the life cycle of batteries while maintaining the standard function of the pasting paper to absorb humidity from the lead paste and to ensure that the paste remains on the grid during the production process and additionally during the life time in the battery.

SUMMARY OF THE INVENTION

The present invention relates to a multifunctional web for use in a lead-acid battery, comprising natural fibres and heat-sealable fibres.

The present inventors have found that a multifunctional web comprising natural fibres and heat-sealable fibres solves the above object in that when the multifunctional web is brought into contact with sulphuric acid, the natural fibres are disintegrated over time whereas a net of synthetic heat-sealed fibres remains, which maintains the paste on the grid and prevents the formation of a gap thereby reducing the friction and limiting erosion of the lead plate. Furthermore, in an AGM battery, the remaining net of synthetic heat-sealed fibres helps to maintain the compression between the lead plates, thereby also reducing the friction between the plates and limiting erosion. As a consequence, the life cycle of conventional lead-acid batteries as well as of AGM batteries can be improved by using the multifunctional web according to the present invention.

Accordingly, the present invention further relates to the use of a multifunctional web according to the present invention in a lead-acid battery, for instance a conventional lead-acid battery or an AGM battery.

Furthermore, the present invention relates to a lead plate, comprising a metal grid coated with a lead paste contacting a multifunctional web according to the present invention.

In addition, the present invention relates to a method of preparing a lead plate, comprising the steps of
  (i) applying a lead paste to a metal grid to thereby obtain a metal grid coated with the lead paste,
  (ii) applying a multifunctional web according to the present invention to the coated grid to thereby obtain a pasted coated grid,
  (iii) optionally cutting the pasted coated grid into an appropriate size, and
  (iv) drying the pasted coated grid to thereby obtain the lead plate.

The present invention further relates to a lead plate obtainable by the method described above.

Moreover, the present invention relates to a lead-acid battery assembly, comprising at least two lead plates of which at least one lead plate is a lead plate according to the present invention and optionally at least one separator.

DETAILED DESCRIPTION OF THE INVENTION

Hereinafter, details of the present invention and other features and advantages thereof will be described. However, the present invention is not limited to the following specific descriptions and embodiments, but they are rather for illustrative purposes only.

The present invention provides a multifunctional web for use in a lead-acid battery, comprising natural fibres and heat-sealable fibres. The multifunctional web according to the invention typically has the form of a sheet. The fibres of the multifunctional web form a net, in particular the natural fibres may form a net with each other and the heat-sealable fibres may form a net with each other and the natural fibres may form a net with the heat-sealable fibres.

In a preferred embodiment, the heat-sealable fibres and the natural fibres are comprised in one single layer. In other words, the multifunctional web preferably comprises one single layer wherein the heat-sealable fibres and the natural fibres are comprised. Thereby, the formation of the net, as described above, can be easily attained and the advantageous effects of the present invention are even further pronounced.

Depending on the manufacturing process, which will be described in detail below, the multifunctional web according to the present invention may comprise one or more plies, preferably one, two or three plies, wherein each ply independently from each other comprises heat-sealable fibres and/or natural fibres. Two, three or more of these plies may have the same composition.

The expression "comprising", as used herein, includes not only the meaning of "comprising" but also encompasses "consisting essentially of" and "consisting of".

The natural fibres according to the invention are preferably cellulosic fibres. Suitable natural fibres for the purposes of the invention include natural fibres known in the art, such as hemp, manila, jute, sisal, rayon, abaca and others, and also include soft wood pulp and hard wood pulp. It is also possible to use mixtures of the above natural fibres.

The natural fibres are preferably contained in an amount of from 20 to 80 wt %, more preferably from 25 to 80 wt %, still more preferably from 30 to 70 wt %, still more preferably from 35 to 60 wt %, still more preferably from 40 to 50 wt % and most preferably from 42 to 48 wt %, based on the weight of the multifunctional web. If the amount of the natural fibres is less than 20 wt %, based on the weight of the multifunctional web, the function of the multifunctional web as a pasting paper, i.e. to absorb humidity from the lead paste, might be impaired. If the amount of natural fibres is more than 80 wt %, based on the weight of the multifunctional web, the formation of a synthetic sealed net to be remained in the presence of sulphuric acid is difficult to achieve, in particular to maintain the paste on the lead plates and to reduce friction.

The heat-sealable fibres, also called herein thermoplastic fibres or synthetic fibres, are fibres that at least partly melt when heated and at least partly fuse with each other and/or with the natural fibres upon resolidifying to thereby form a sealed net. The materials of the heat-sealable fibres suitable for use in the present invention are not particularly limited as long as the heat-sealable fibres are resistant to acid. As used herein, "resistant to acid" denotes that the fibres do not disintegrate in sulphuric acid having a concentration of 27 to 38% (v/v). Preferred materials for the heat-sealable fibres according to the present invention include polyethylene (PE), polypropylene (PP) and polyester, such as polyethylene terephthalate (PET) and polylactic acid) (PLA). It is also possible to use mixtures of the above heat-sealable fibres.

In a preferred embodiment, the heat-sealable fibres comprise bicomponent fibres, preferably bicomponent fibres of the sheath-core type. Bicomponent fibres are composed of two sorts of polymers having different physical and/or chemical characteristics, in particular different melting characteristics. A bicomponent fibre of the sheath-core type typically has a core of a higher melting point component and a sheath of a lower melting point component. Examples of bicomponent fibres, suitable for use in the present invention, include PET/PET fibres, PE/PP fibres and PLA/PLA fibres. It is also possible to use mixtures of the above heat-sealable bicomponent fibres as well as mixtures of bicomponent and monocomponent heat-sealable fibres.

The heat-sealable fibres are preferably contained in an amount of from 20 to 80 wt %, more preferably from 20 to 75 wt %, still more preferably from 30 to 70 wt %, still more preferably from 40 to 65 wt %, still more preferably from 50 to 60 wt % and most preferably from 52 to 58 wt %, based on the weight of the multifunctional web. If the amount of the heat-sealable fibres is less than 20 wt %, based on the weight of the multifunctional web, the formation of a synthetic sealed net to be remained in the presence of sulphuric acid is difficult to achieve, in particular to maintain the paste on the lead plates and the reduction of friction. If the amount of heat-sealable fibres is more than 80 wt %, based on the weight of the multifunctional web, the synthetic sealed net, remained in the presence of sulphuric acid, might become too dense and might thereby impair the functioning of a battery during charging and discharging.

The multifunctional web according to the invention preferably has a grammage of from 9 to 50 $g/m^2$, more preferably from 15 to 40 $g/m^2$, still more preferably from 20 to 35 $g/m^2$ and most preferably from 25 to 30 $g/m^2$.

The length and the coarseness of the natural fibres are not particularly limited. Typically, the natural fibres have a length of less than 35 mm, preferably from 1 to 15 mm, more preferably from 1 to 5 mm and most preferably from 1 to 4 mm, Typically, the natural fibres have a coarseness of from 40 to 400 mg/kg, preferably from 45 to 300 mg/km, more preferably from 50 to 280 mg/km and most preferably from 60 to 250 mg/km.

The coarseness of a fibre is defined as the weight per unit length of the fibre.

The synthetic fibres suitable for use in the present invention typically have a length of less than 25 mm, preferably from 2 to 15 mm, more preferably from 4 to 10 mm and most preferably 5 mm. The heat-sealable fibres suitable for use in the present invention typically have a coarseness of from 1 to 5 dtex, preferably from 1.5 to 3 dtex, more preferably from 2 to 2.5 dtex and most preferably 2.2 dtex.

In view of its functions as a pasting paper, the multifunctional web according to the present invention must be able to absorb humidity from the paste. This characteristic provides a good adhesion to the paste in wet and dried state. The multifunctional web provides a sufficient VTR (vapour transmission rate) and air permeability to allow the vapour/humidity and air going through the web in the oven and curing chamber.

The multifunctional web according to the present invention may further comprise a wet-strength agent. A wet-strength agent is an agent that improves the tensile strength of the paper in wet condition. Suitable examples of the wet-strength agent include a polyamine-polyamide-epichlorohydrine resin and a melamine-formaldehyde resin or an isocyanate. It is also possible to use mixtures of the above wet-strength agents.

A polyamine-polyamide-epichlorohydrine resin is usually not used as a wet-strength agent in conventional pasting paper because of an undesired release of halogen containing compounds, in particular chloride ions, into the electrolyte. However, the present inventors have found that the multifunctional web according to the present invention comprising a polyamine-polyamide-epichlorohydrine resin as a wet-strength agent does not suffer from this disadvantage of conventional pasting paper, and in view of its excellent properties as a wet-strength agent, a polyamine-polyamide-epichlorohydrine resin is therefore preferred according to the present invention.

The multifunctional web according to the present invention can be prepared by a conventional paper-making process using a paper machine, preferably an inclined wire paper machine.

Figure 1:
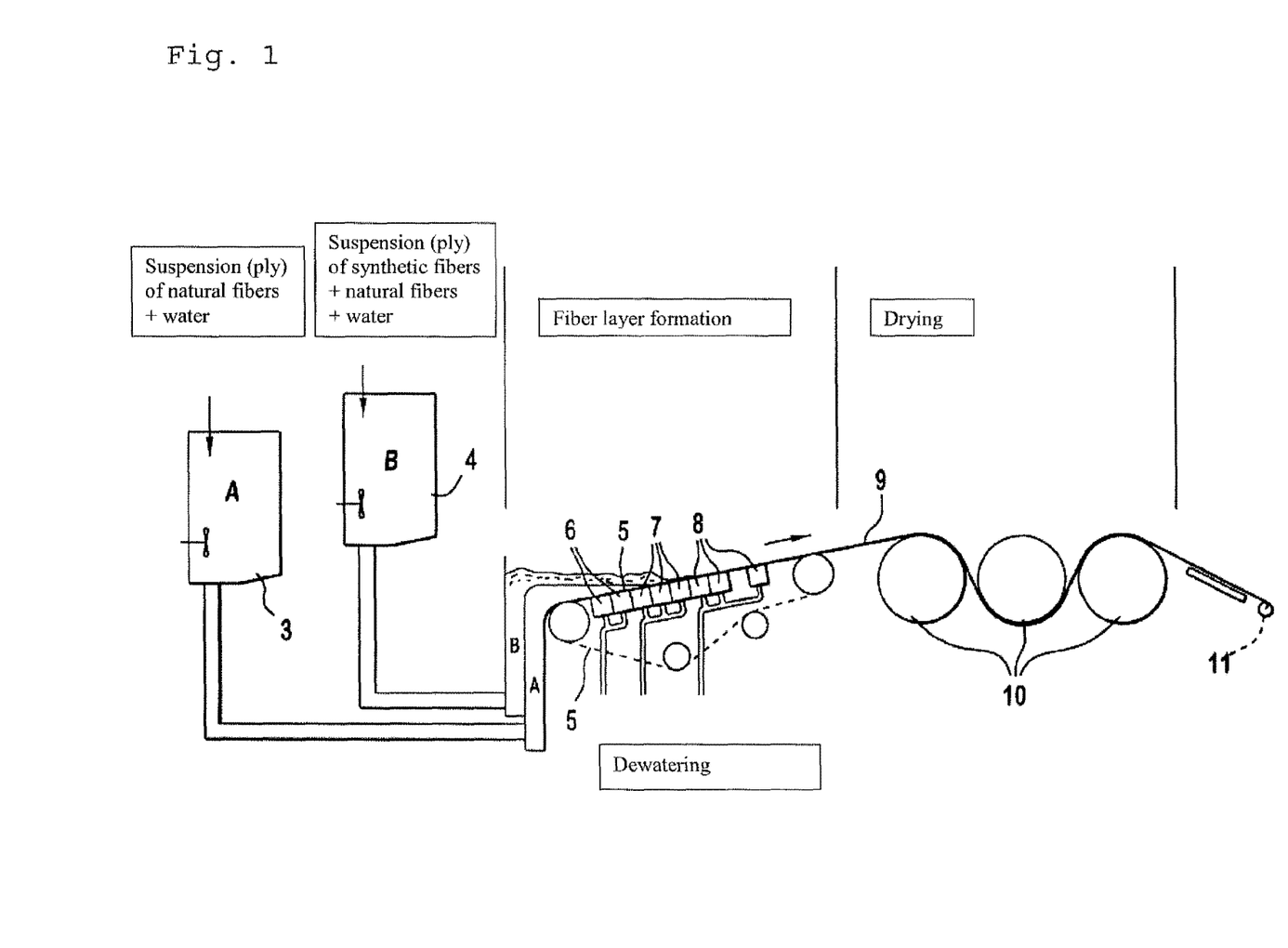
FIG. 1 is a schematic diagram of equipment suitable for manufacturing the multifunctional web according to the present invention.

FIG. 1 shows a schematic diagram of an equipment suitable for manufacturing the multifunctional web according to the invention. First, a suspension (ply) "A" is formed from natural fibres and water. In addition, a suspension (ply) "B" is prepared from heat-sealable synthetic fibres and natural fibres and water. The two suspensions (plies) A and B are fed from the respective vessels (3 and 4) via the head box to the paper machine. It essentially possesses a circulating wire (5) that travels across a number of dewatering chambers (6, 7 and 8). The two suspensions (plies) A and B are passed onto the wire (5), either simultaneously or consecutively thereby forming a multifunctional web with two plies. While the wire travels across the dewatering chambers (6, 7 and 8), the suspensions (plies) are dewatered and the fibres are laid down on the wire. In the case of a consecutive passing of the two suspensions (plies) A and B onto the wire, as a result of the dewatering operation, the two dewatered fibre suspensions (plies) come to partially interpenetrate each other. The resultant formed material (9), composed of natural fibres and heat-sealable fibres, is then taken off the wire and sent to a drying operation, This drying operation can be effected in various ways such as by contact drying or through-air drying or a combination of both. In FIG. 1, three drying cylinders (10) are shown, via which the formed paper web is contact-dried. The heating of the dry fibrous material causes the heat-sealable fibres to partly melt. After the paper is dry, the web is heated to a certain temperature which forces the synthetic fibres to melt to a certain level. After having passed the drying section and the melting section (spooner), the thermoplastic fibres resolidify and thereby at least partially form a bond with the natural fibres and the resulting multifunctional web is wound up on a roll (11).

A suitable method of preparing the multifunctional web according to the present invention is described in US 2004/0129632 A1, the disclosure of which is incorporated herein by reference.

The multifunctional web according to the present invention is preferably used in a lead-acid battery including a conventional lead-acid battery and an AGM battery, such as a starter battery for vehicles. In particular, the multifunctional web according to the invention is used to support a lead paste, i.e. as a pasting paper. The multifunctional web according to the present invention typically does not act as a separator between the lead plates.

The present invention further relates to a method of preparing a lead plate, comprising the steps of
(i) applying a lead paste to a metal grid to thereby obtain a metal grid coated with the lead paste,
(ii) applying a multifunctional web according to the invention to the coated grid to thereby obtain a pasted (i.e. laminated) coated grid,
(iii) optionally cutting the pasted coated grid into an appropriate size, and
(iv) drying the pasted coated grid to thereby obtain the lead plate.

It is preferred that prior to the above step (i), a multifunctional web according to the invention is placed underneath the metal grid. Thereby, the effect of absorbing humidity from the lead paste and the effect of ensuring that the paste remains on the grid during the production process can be further improved.

The above drying step (iv) preferably comprises a partial drying step and subsequently a curing and drying step of the lead plates in a curing chamber. In the partial drying step, typically only the surface of the lead paste is dried and in the curing and drying step, typically chemical reactions take place so that the lead paste is hardened.

The metal grid, suitable for use in the present invention, is not particularly limited and any metal grid customary in the field of lead-acid batteries can be used. The metal grid is preferably a continuous metal grid. Examples of the material of the metal grid include lead and lead alloys.

The lead paste, suitable for use in the present invention, is not particularly limited and any lead paste customary in the field of lead-acid batteries can be used. The lead paste typically contains metallic lead or lead(TV) oxide.

Figure 2:
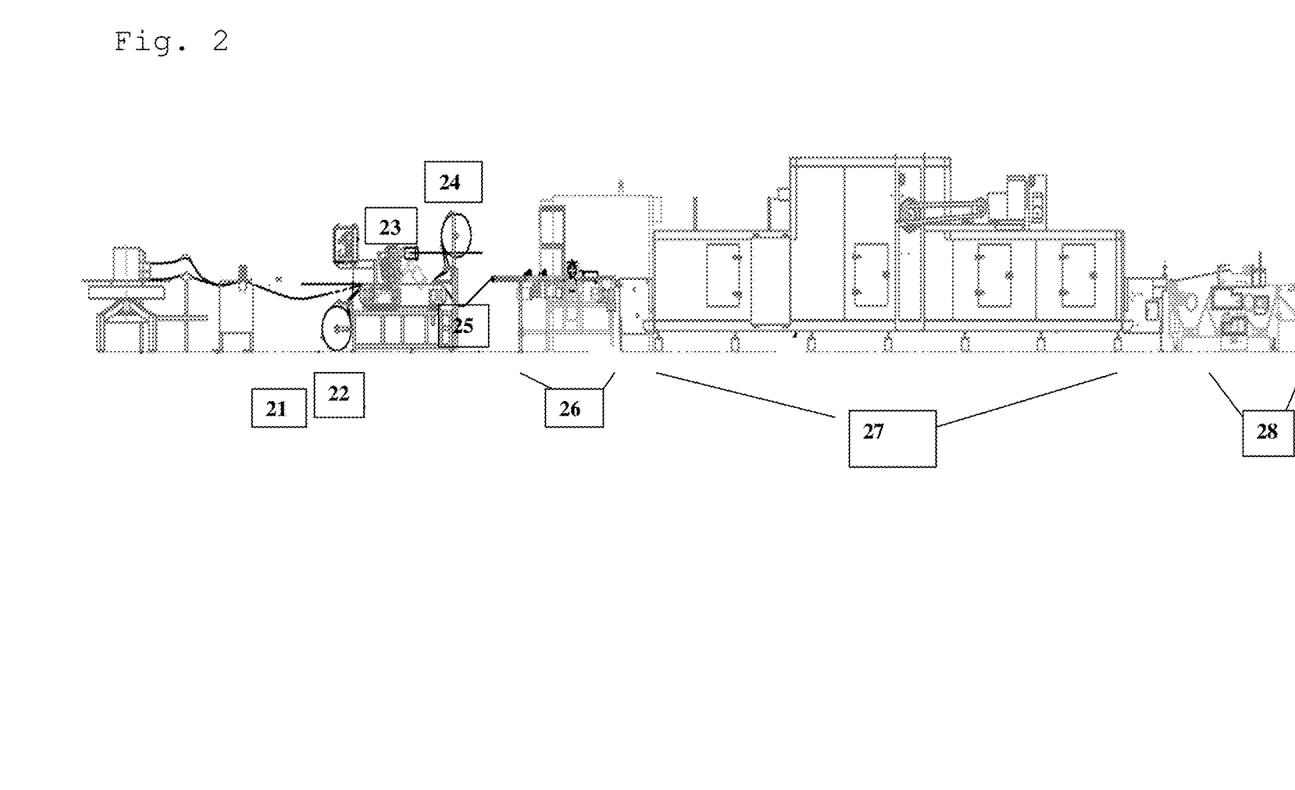
FIG. 2 is a schematic diagram of equipment suitable for manufacturing a lead plate according to the present invention.

An exemplary method of preparing a lead plate according to the present invention is shown in FIG. 2. A bottom multifunctional web (22) is placed underneath a metal grid (21) before a lead paste (23) is pasted (applied) onto and into the metal grid so that a metal grid coated with the lead paste is obtained. In the step (24), the multifunctional web according to the present invention is applied to the coated metal grid from above, so that a pasted coated grid is obtained, with the web on the top and the bottom side. Subsequently, the pasted coated grid is typically pressed, for instance by means of rollers (25). Next, the pasted coated grid is typically cut (26) into an appropriate size, suitable for being placed in a lead-acid battery container. In the next step, the (cut) pasted coated grid is partly dried in an oven, such as a flash oven (27), and afterwards typically stacked (28) onto pallets. The temperature and the residence time in the oven can be readily adjusted by a person skilled in the art in a manner customary to the production of conventional lead plates. The pallets are transported into the curing chamber. In the curing chamber, final chemical reactions take place, before the plates are finally dried—still in the curing chamber. The temperature and the humidity in the curing chamber can be readily adjusted by a person skilled in the art in a manner customary to the production of conventional lead plates.

A lead plate according to the present invention typically comprises a metal grid coated with a lead paste, contacting a multifunctional web according to the present invention and is typically obtainable by the method for preparing a lead plate according to the present invention.

The lead-acid battery assembly according to the present invention comprises at least two lead plates of which at least one lead plate is a lead plate according to the present invention and optionally at least one separator. In the case of a conventional lead-acid battery, a separator is necessary in order to prevent a short-circuit between the plates during use. The separator, suitable for use in the present invention, is not particularly limited and any separator customary in the field of lead-acid batteries can be used. Typical examples of the material of the separator include a glass fibre mat, rubber, polyethylene and polyvinyl chloride.

The lead-acid battery assembly is typically in a form that enables it to be placed into a cell of a battery container. One multi plates cell element comprises positive plates, negative plates and separators. This multi plates cell element is placed in a thermoplastic container. Six of these multi plates cell elements connected in series form a 12V battery.

The thermoplastic container is then typically filled with an electrolyte of approximately 27 to 38% (v/v) sulphuric acid. After addition of the sulphuric acid, according to the present invention the natural fibres will be dissolved and the heat-sealable fibres remain so that the synthetic sealed net maintains the lead paste on the grid and limits the erosion and reduces the friction.

Example of the multifunctional web according to the present invention:
   Natural fibres: soft wood pulp (approx. 44 wt.-%)
   Heat-sealable fibres: bicomponent fibres PET/PET (2.2 dtex/5 mm) (approx. 56 wt.-%)
   Wet-strength agent: polyamine-polyamide-epichlorohydrine
      resin (approx. 1 wt.-% in the finished paper)

COMPARATIVE EXAMPLE (Conventional Pasting Paper)

Natural fibres: soft wood pulp (100 wt.-%)
Wet-strength agent: melamine-formaldehyde resin (approx. 1 wt.-% in the finished paper)

The multifunctional web according to the present invention (Example) and the conventional pasting paper (Comparative Example) were placed in sulphuric acid (concentration: 60% (v/v)). After one day at 60° C., the conventional pasting paper is completely dissolved whereas from the multifunctional web according to the present invention, the synthetic fibre net remained.

The test results of physical data are shown in the following table:

|  |  | Comp. Example | Example | |
|---|---|---|---|---|
|  |  |  | Type of fibers | |
|  |  | Cellulose *1 | Cellulose/ synthetic *1 | synthetic *2 |
| Grammage | g/m² | 12.5 | 28 | 15 |
| Thickness | μm | 45 | 92 | 66 |
| Dry Tensile strength MD *3 | N/15 mm | 12 | 16 | 3.5 |
| Wet tensile strength MD *4 | N/15 mm | 5 | 6.5 | 3 |
| Air permeability *5 | l/m²s | 1800 | 1200 | 1200 |

-continued

|  |  | Comp. Example | Example | |
|---|---|---|---|---|
|  |  |  | Type of fibers | |
|  |  | Cellulose *1 | Cellulose/ synthetic *1 | synthetic *2 |
| Capillary rise MD *6 | mm/ 10 min | 47 | 106 | 0 |
| Capillary rise MD *6 | mm/30 s | 15 | 25 | 0 |

*1 Before treatment with sulphuric acid (60%)
*2 After treatment with sulphuric acid (60%) (1 day/60° C.)
*3 determined in accordance with ISO 1924-2
*4 determined in accordance with ISO 3781
*5 determined in accordance with DIN 53 887
*6 determined in accordance with ISO 8787

Figure 3:
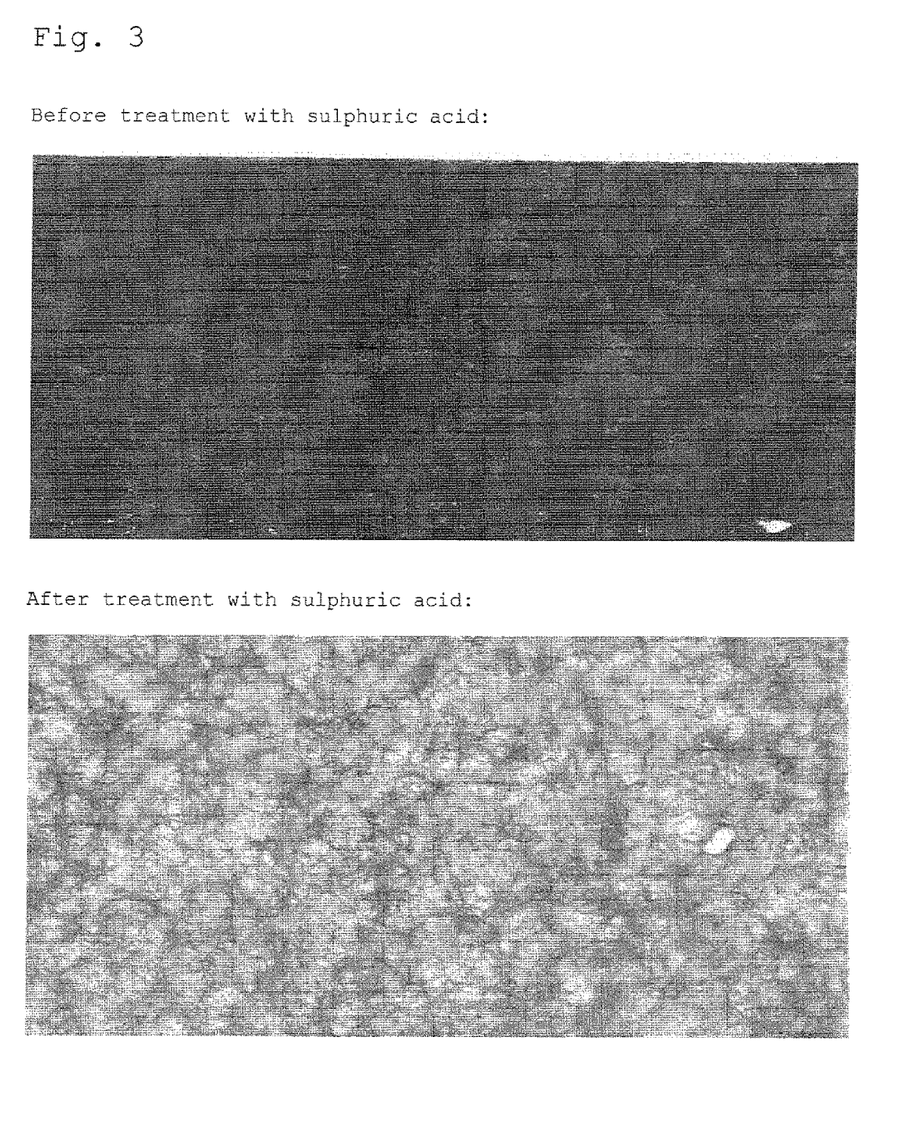
FIG. 3 depicts photographs of a multifunctional web according to the present invention wherein the upper photograph shows the multifunctional web according to the present invention having natural and synthetic fibres before treatment with sulphuric acid and the lower photograph shows the same multifunctional web after treatment with sulphuric acid (60%) where only the synthetic fibre net remained.

The upper part of FIG. 3 shows the multifunctional web of the Example according to the present invention. The fibres were coloured with a reagent so that the natural fibres are stained in blue and the synthetic fibres are stained in red.

After treatment with sulphuric acid of 60% for one day at 60° C. only the synthetic fibre net remained, as shown in the lower part of FIG. 3.

While the present invention has been described in detail by way of specific embodiments and examples, the invention is not limited thereto and various alterations or modifications are possible, without departing from the scope of the invention.

The invention claimed is:

1. A method for manufacturing a lead-acid battery comprising:
   applying a pasting paper to a lead paste or grid during manufacturing of a lead-acid battery;
   wherein the pasting paper at least initially comprises natural fibers and heat-sealable fibers; and
   wherein the natural fibers and the heat-sealable fibers are initially comprised in a single layer and after addition of sulphuric acid to the lead-acid battery the natural fibers dissolve and the heat-sealable fibers remain as a net of heat-sealable fibers.

2. A lead plate for a lead-acid battery, comprising:
   a grid;
   a lead composition contacting the grid; and
   a pasting paper in contact with the lead composition, wherein the pasting paper at least initially comprises natural fibers and heat-sealable fibers in a single layer.

3. A method of preparing a lead plate for a lead-acid battery, comprising:
   (i) applying a lead paste to a grid to thereby obtain a grid coated with said lead paste,
   (ii) applying a pasting paper to said coated grid to thereby obtain a pasted coated grid, wherein the pasting paper at least initially comprises natural fibers and heat-sealable fibers in a single layer;
   (iii) optionally cutting said pasted coated grid into an appropriate size, and
   (iv) drying the pasted coated grid.

4. A lead plate produced by the method according to claim 3.

5. The method of claim 3, wherein the pasting paper is configured such that after addition of sulphuric acid to the pasting paper the natural fibers dissolve and the heat-sealable fibers remain as a net of heat-sealable fibers.

6. The method of claim 3, wherein the natural fibers are initially present in an amount of from 20 to 80 wt. % based on the weight of the pasting paper.

7. The method of claim 3, wherein the heat-sealable fibers are initially present in an amount of from 20 to 80 wt. % based on the weight of the pasting paper.

8. A lead-acid battery assembly, comprising at least two lead plates of which at least one lead plate comprises:
   a grid;
   a lead composition in contact with the grid, and
   a pasting paper in contact with the lead composition, wherein the pasting paper at least initially comprises natural fibers and heat-sealable fibers;
   wherein the natural fibers and the heat sealable fibers are initially comprised in a single layer;
   the lead-acid battery optionally further comprising at least one separator disposed between the two lead plates,
   wherein-after addition of sulphuric acid to the lead-acid battery the natural fibers dissolve and the heat-seal able fibers remain as a net of heat-sealable fibers.

9. The lead-acid battery assembly according to claim 8, wherein the natural fibers comprise cellulosic fibers.

10. The lead-acid battery assembly according to claim 8, wherein the heat-sealable fibers comprise polyethylene, polypropylene, polyester, or mixtures thereof.

11. The lead-acid battery assembly of claim 8, wherein the heat-sealable fibers comprise bicomponent fibers.

12. The lead-acid battery assembly of claim 8, wherein the natural fibers are initially present in an amount of from 20 to 80 wt. % based on the weight of the pasting paper.

13. The lead-acid battery assembly of claim 8, wherein the heat-sealable fibers are initially present in an amount of from 20 to 80 wt. % based on the weight of the pasting paper.

14. The lead-acid battery assembly of claim 8, wherein the pasting paper further comprises a wet-strength agent.

15. The lead-acid battery assembly of claim 8, wherein the pasting paper is a single layer comprising one, two or more plies, each ply comprising heat-sealable fibers, natural fibers, or both heat-sealable fibers and natural fibers.

\* \* \* \* \*

UNITED STATES PATENT AND TRADEMARK OFFICE
CERTIFICATE OF CORRECTION

PATENT NO. : 10,164,261 B2
APPLICATION NO. : 14/127411
DATED : December 25, 2018
INVENTOR(S) : Lutz Friedl-Goeppentin et al.

It is certified that error appears in the above-identified patent and that said Letters Patent is hereby corrected as shown below:

In the Claims

In Column 9, Line 18, in Claim 8, delete "wherein-after addition" and insert --wherein after addition--

In Column 9, Line 19, in Claim 8, delete "heat-seal able fibers" and insert --heat-sealable fibers--

Signed and Sealed this
Twenty-third Day of April, 2019

Andrei Iancu
*Director of the United States Patent and Trademark Office*